(12) United States Patent
Rojas

(10) Patent No.: US 11,370,595 B2
(45) Date of Patent: Jun. 28, 2022

(54) DUAL COMPARTMENT SHAKER BOTTLE

(71) Applicant: Victor Rojas, Menifee, CA (US)

(72) Inventor: Victor Rojas, Menifee, CA (US)

( * ) Notice: Subject to any disclaimer, the term of this patent is extended or adjusted under 35 U.S.C. 154(b) by 124 days.

(21) Appl. No.: 16/820,453

(22) Filed: Mar. 16, 2020

(65) Prior Publication Data

US 2021/0284427 A1    Sep. 16, 2021

(51) Int. Cl.
*B65D 81/38* (2006.01)
*A47G 19/12* (2006.01)
(Continued)

(52) U.S. Cl.
CPC ......... *B65D 81/3841* (2013.01); *A47G 19/12* (2013.01); *A47G 19/24* (2013.01);
(Continued)

(58) Field of Classification Search
CPC .. A47G 19/12; A47G 19/24; A47G 2019/122; A47J 43/27; A47J 41/02;
(Continued)

(56) References Cited

U.S. PATENT DOCUMENTS

| 378,752 A | * | 2/1888 | Ader | B65D 1/04 |
| | | | | 215/6 |
| 2,833,436 A | * | 5/1958 | Ruderian | A47J 41/02 |
| | | | | 215/6 |

(Continued)

FOREIGN PATENT DOCUMENTS

WO    WO 2015/111001 A1    6/2015

*Primary Examiner* — Gideon R Weinerth
(74) *Attorney, Agent, or Firm* — McConnell Law Firm, P.C.; Robert McConnell

(57) ABSTRACT

The claimed invention relates to bottles used by exercise enthusiasts for carrying liquids, solids and/or powdered nutritional supplements with liquids for mixing said supplements. Exercise aficionados consume a variety of hydrating liquids, nutritional supplements mixed with liquids or solid food items before, during and after their exercise periods. People who exercise use a variety of bottles including shakers, squeeze and water bottles to hold and consume their liquids, foods and supplements during their workouts.

The present invention is an improved dual compartment shaker bottle for various nutritional supplements, liquids and combinations thereof. The dual compartments allow the user to carry two different liquids, nutritional supplements, combinations of liquids and supplements or solids for use before, during and after their workout. They no longer need two or more shaker bottles to accomplish this.

Further, the claimed invention includes two compartment tops that securely attach to the bottle with a screw on and off mechanism and provide openings to consume the contents of each chamber. Each chamber is designed with curved closed end without corners/angles that cause clumping and reduced dissolving of supplements. The disclosed invention has attachment clips at each end to assist the user in carrying the bottle in a number of places. Further, the side of the bottle is ribbed for easy gripping.

To assist the user in assessing the volume of material in each compartment, a measuring scale is included along the length of each compartment. A double wall exterior is disclosed to provide insulation to maintain the temperature of the materials in each compartment.

11 Claims, 5 Drawing Sheets

(51) Int. Cl.
*A47G 19/24* (2006.01)
*B65D 43/02* (2006.01)
*G01F 23/02* (2006.01)
*B65D 23/00* (2006.01)
*B65D 81/32* (2006.01)

(52) U.S. Cl.
CPC ....... *B65D 23/003* (2013.01); *B65D 43/0231* (2013.01); *G01F 23/02* (2013.01); *A47G 2019/122* (2013.01); *B65D 81/3205* (2013.01); *B65D 2203/04* (2013.01)

(58) Field of Classification Search
CPC .. B01F 13/0022; B01F 15/00512; B65D 1/04; B65D 1/06; B65D 23/003; B65D 43/0231; B65D 81/3205; B65D 2203/04; G01F 23/02
USPC ......... 220/504, 633, 916, 4.26, 592.27, 503, 220/254.1, 380; 215/6
See application file for complete search history.

(56) References Cited

U.S. PATENT DOCUMENTS

| | | | | |
|---|---|---|---|---|
| 3,327,881 | A * | 6/1967 | Maier | A47J 41/02 215/6 |
| 3,465,905 | A * | 9/1969 | Schottanes | B65D 77/0486 215/6 |
| 3,705,661 | A * | 12/1972 | Davis | A47J 41/02 215/6 |
| 3,744,622 | A * | 7/1973 | Weaver | A47J 41/02 206/543 |
| 3,820,692 | A * | 6/1974 | Swett et al. | B65D 47/0895 222/547 |
| D248,812 | S * | 8/1978 | Eiserman | B65D 51/242 D9/535 |
| 5,335,809 | A * | 8/1994 | Toida | A47J 41/0011 220/23.88 |
| 5,884,796 | A * | 3/1999 | Hallmark | A47J 41/02 220/23.88 |
| 6,012,616 | A * | 1/2000 | Alberts | A47J 36/14 222/465.1 |
| 6,092,717 | A * | 7/2000 | Lowry | B65D 3/22 229/120.32 |
| 6,105,812 | A | 8/2000 | Riordan | |
| 6,237,800 | B1 * | 5/2001 | Barrett | A01K 7/00 215/312 |
| 6,398,050 | B1 | 6/2002 | Allora | |
| 6,910,573 | B2 | 6/2005 | Deans | |
| D528,862 | S * | 9/2006 | Li | D7/510 |
| 7,614,512 | B2 | 11/2009 | Nader | |
| 8,365,941 | B2 | 2/2013 | Mayer | |
| 8,371,244 | B2 * | 2/2013 | Krasner | A01K 7/00 119/72.5 |
| D698,266 | S * | 1/2014 | Downs | D9/741 |
| 8,777,044 | B1 | 7/2014 | Raymus et al. | |
| D739,180 | S * | 9/2015 | Beardsell | D7/511 |
| D747,148 | S * | 1/2016 | Beardsell | D7/511 |
| 10,104,994 | B2 | 10/2018 | Rage et al. | |
| 10,173,825 | B1 * | 1/2019 | Ercole | B65D 51/2807 |
| 10,301,054 | B2 | 2/2019 | Pell et al. | |
| D859,919 | S * | 9/2019 | Gronkowski | D7/510 |
| D871,922 | S * | 1/2020 | El Beaini | B65D 3/22 D9/741 |
| D892,555 | S * | 8/2020 | Beardsell | D7/510 |
| 2002/0110622 | A1 | 8/2002 | Lloyd et al. | |
| 2003/0111496 | A1 * | 6/2003 | Abbott | F16B 45/02 224/148.6 |
| 2003/0146254 | A1 * | 8/2003 | Blondeel | B65D 47/14 224/148.4 |
| 2003/0192894 | A1 | 10/2003 | Munns | |
| 2004/0159625 | A1 | 8/2004 | Kwon | |
| 2004/0217139 | A1 * | 11/2004 | Roth | B65D 47/243 224/148.7 |
| 2004/0250386 | A1 * | 12/2004 | Goldberg | F21L 4/005 24/601.5 |
| 2004/0262173 | A1 | 12/2004 | Buesching et al. | |
| 2005/0098527 | A1 | 5/2005 | Yates, III | |
| 2006/0138169 | A1 | 6/2006 | Cafferty | |
| 2009/0223999 | A1 | 9/2009 | Hill et al. | |
| 2010/0078436 | A1 | 4/2010 | Winchell et al. | |
| 2010/0200438 | A1 * | 8/2010 | Davies | B65D 71/502 206/223 |
| 2013/0043264 | A1 * | 2/2013 | Yang | A45F 5/00 220/763 |
| 2014/0233344 | A1 * | 8/2014 | Aliberti | B01F 15/00512 366/130 |
| 2014/0360908 | A1 * | 12/2014 | Sorensen | B65D 51/28 206/501 |
| 2015/0201775 | A1 * | 7/2015 | Sorensen | A47G 19/2266 222/482 |
| 2015/0239600 | A1 | 8/2015 | Patel | |
| 2015/0353259 | A1 | 12/2015 | Burden | |
| 2015/0360804 | A1 | 12/2015 | Ayeni | |
| 2015/0360831 | A1 * | 12/2015 | Backert | B65D 47/08 222/109 |
| 2016/0123786 | A1 | 5/2016 | Hanna et al. | |
| 2016/0200474 | A1 | 7/2016 | Burden | |
| 2016/0280447 | A1 * | 9/2016 | Beardsell | B65D 47/148 |
| 2016/0376061 | A1 * | 12/2016 | Shirley | B65D 23/104 215/228 |
| 2017/0105581 | A1 * | 4/2017 | Enghard | B01F 13/0055 |
| 2017/0225850 | A1 * | 8/2017 | Sorensen | B65D 25/56 |
| 2018/0162582 | A1 | 6/2018 | Deylamian et al. | |
| 2019/0075973 | A1 * | 3/2019 | Charleson | B65D 47/142 |
| 2020/0283217 | A1 * | 9/2020 | Beardsell | B65D 23/108 |
| 2021/0061523 | A1 * | 3/2021 | Bytheway | F16B 35/047 |
| 2021/0147127 | A1 * | 5/2021 | Kitto | B65D 51/242 |
| 2021/0237935 | A1 * | 8/2021 | Truong | B65D 51/24 |

* cited by examiner

DUAL COMPARTMENT SHAKER BOTTLE

BACKGROUND OF THE INVENTION

Field of the Invention

The claimed invention relates to bottles used by exercise enthusiasts for carrying liquids, solids and/or powdered nutritional supplements with liquids for mixing said supplements. Exercise aficionados consume a variety of hydrating liquids, nutritional supplements mixed with liquids or solid food items before, during and after their exercise periods. People who exercise use a variety of bottles including shakers, squeeze and water bottles to hold and consume their liquids, foods and supplements during their workouts.

The claimed invention includes two compartments for keeping two separate liquids or solids for consumption before, during and/or after exercise. The dual compartments allow easy carrying and consumption of multiple liquids, solids and/or nutritional supplements. While the use of this novel invention is targeted to exercise enthusiasts, the claims are not so limited and the invention could be used in many various arts where two separate compartments are needed.

Description of Background Art

A variety of solutions to the existing problems in the art have been proposed that do not address the problems solved by the disclosed invention.

Canadian Patent 2,718,380A1 describes a work out beverage container with two compartments, one at the top surrounding a second compartment at the bottom. The second compartment is designed to be used for powders, packets, identification and other non-liquid items and not for mixing and consuming liquids. The device does not include the attachment means and curved closed ends disclosed in the present claimed invention.

U.S. Pat. No. 6,105,812 describes a dual compartment bottle for storing carbonated beverages. The claimed invention does not disclose the curved closed ends for preventing clumping, or the attachment means of the present invention.

U.S. Pat. No. 8,777,044 describes a dual compartment workout shaker but with the compartments arranged side by side and with dual openings at the top. This patent does not disclose the curved closed ends or attachment means described in the claimed invention.

US Patent Application Publication No 2002/0110622 discloses a dual compartment for two different products, one solid, one liquid. The disclosed device only shows one compartment top, does not show the curved closed ends for preventing clumping, or the attachment means of the present invention.

Related US Patent Application Publication Nos. 2015/0353259 and US2016/0200474 both disclose a dual chamber sport drink bottle with two straws located at the top. The disclosed device does not show the curved closed ends for preventing clumping, or the attachment means of the present invention.

US Patent Application Publication No. 2015/0360804 disclose a dual chambered bottle with a top compartment and a bottom compartment with a straw selectively attachable to each compartment. The disclosed device does not show the curved closed ends for preventing clumping, the compartment tops attachable by secure screw on method or the attachment means of the present invention.

US Patent Application Publication No. 2016/0123786 discloses a multi-compartment container for storing and mixing supplements. Disclosed device also includes a funnel for pouring liquids. The disclosed device does not disclose dual compartments for liquids, the curved closed ends for preventing clumping, the compartment tops attachable by secure screw on method or the attachment means of the present invention.

U.S. Pat. No. 10,301,054 discloses a single compartment shaker bottle with multiple storage compartments included in the body. The multiple storage compartments do not include openings for consuming liquid, nor does the device disclosed include the curved closed ends for preventing clumping, the compartment tops attachable by secure screw on method or the attachment means of the present invention.

OBJECTS OF THE INVENTION

It is an object of the invention to provide a shaker bottle that includes two separate compartments for different materials.

It is an object of the invention to provide an attachable and detachable top for each of the two compartments.

It is an object of the invention to provide a curved closed end surface of the inside of each compartment to prevent clumping of nutritional supplements.

It is an object of the invention to provide easy transportation means with a first ring and a second ring for attachment on the shaker bottle.

It is an object of the invention to provide secure attachment with a lockable clip attached to the shaker bottle.

It is an object of the invention to provide a shaker bottle with a double walls with an insulation material between the walls to maintain temperature of materials contained within each chamber.

It is an object of the invention to provide an easy to grip exterior surface with raised ribs for better grip.

SUMMARY OF THE INVENTION

The present invention is an improved dual compartment shaker bottle for various nutritional supplements, liquids and combinations thereof. The dual compartments allow the user to carry two different liquids, nutritional supplements, combinations of liquids and supplements or solids for use before, during and after their workout. They no longer need two or more shaker bottles to accomplish this.

Further, the claimed invention includes two compartment tops that securely attach to the bottle with a screw on and off mechanism and provide openings to consume the contents of each chamber. Each chamber is designed with curved closed end without corners/angles that cause clumping and reduced dissolving of supplements. The disclosed invention has attachment clips at each end to assist the user in carrying the bottle in a number of places. Further, the side of the bottle is ribbed for easy gripping.

To assist the user in assessing the volume of material in each compartment, a measuring scale is included along the length of each compartment. A double wall exterior is disclosed to provide insulation to maintain the temperature of the materials in each compartment.

The disclosed device can be manufactured from BPA free plastic, stainless steel, aluminum, glass or any other suitable material.

DESCRIPTION OF THE PREFERRED EMBODIMENT

The disclosed invention and the preferred embodiment disclosed herein relate to a novel dual compartment shaker bottle specifically designed for exercise aficionados. Exercise enthusiasts often consume multiple nutritional supplements before, during and after their workouts. Many of these supplements come in powdered form that must be mixed with a liquid for maximum efficacy. Users often desire to consume one supplement at one time, either before or during their workout and another after the workout. This device makes it possible to store, mix and consume two different items in each compartment. A user might use each compartment for a different nutritional supplement such as a pre-workout supplement in compartment or and a post workout supplement in the other compartment. One of the compartments could be utilized for solid items such as nuts, cereal or granola, while the other is used for a liquid or a powdered supplement and liquid combinations. There are a multitude of useful combinations available with the preferred embodiment of the claimed invention below.

Figure 1:
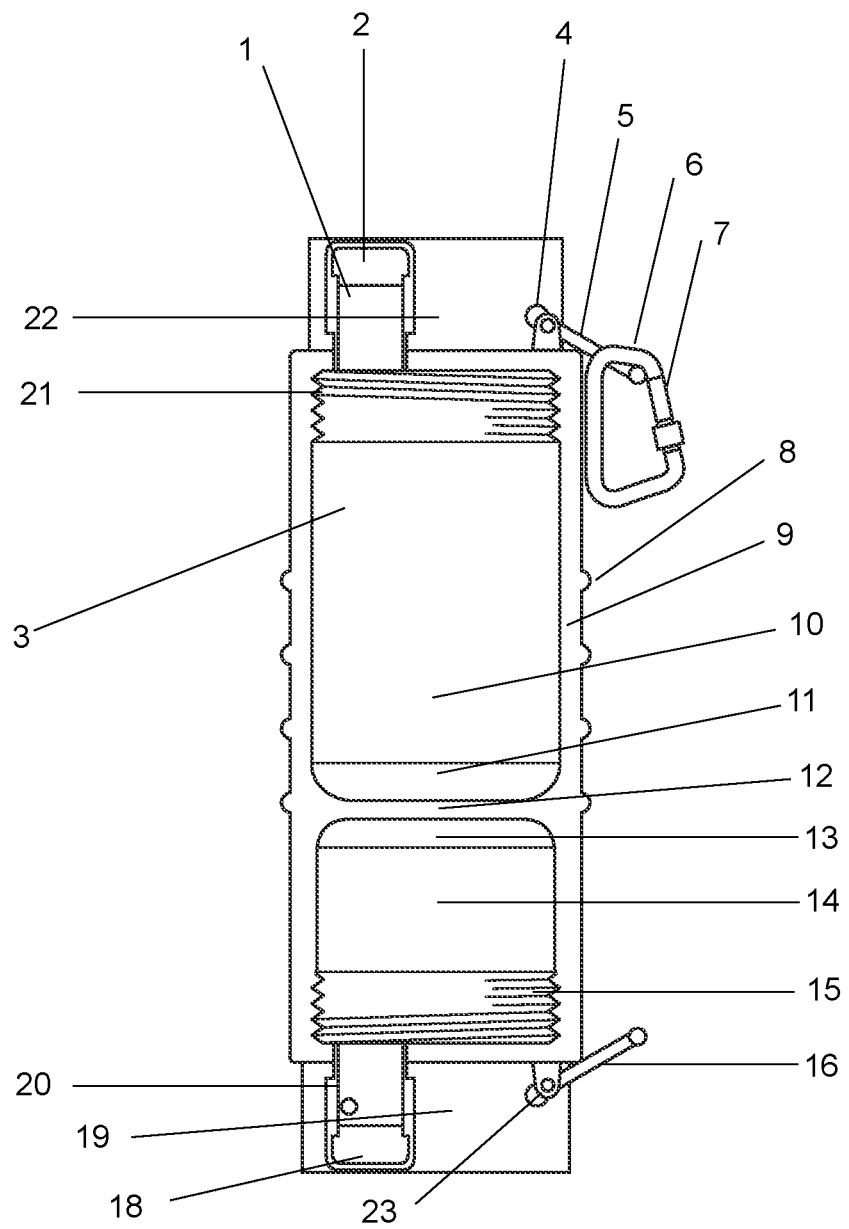
FIG. 1 shows a side cutaway view of the dual compartment shaker bottle.

FIG. 1 shows a side cutaway view of the preferred embodiment of dual compartment shaker bottle 3. At the top of the bottle, first opening 1 allows consumption of liquids, solids or mixtures of powders and liquid contained in first compartment 10. First compartment 10 has an open end and a closed end. First opening 1 is designed to provide an appropriate opening size to allow exit of materials contained in compartment 10 with a flow that allows for human consumption in a controlled manner without spillage. First compartment 10 can be used to contain any number of liquid, solid or powder and liquid combinations. Powders can include protein powder, pre-workout, vitamin mixtures or other powdered nutritional supplements that are used by exercise aficionados.

First opening 1 is closed by first cap 2 that provides a sealed closure to first opening 1. First compartment top 22 attaches and detaches from the shaker bottle by screwing on and off with first threads 21. The apparatus can be carried with first clip 6. First clip 6 has a closeable and lockable first latch 7 that allows the clip to be opened or securely closed around a variety of attachment locations including rings on backpacks, workout bags, belt loops and other loops for attaching such items. First clip 6 securely clips to first ring 5 which is attached to the shaker bottle.

First compartment 10 is enclosed by double wall 9. Double wall 9 is comprised of two layers of material, in the case of the preferred embodiment, BPA free plastic, with an air gap between each later. The air contained within this gap provides insulation so that cold liquids stay cold longer and hot liquids retain their heat for a long period. A plurality of ribs 8 provide means for easy gripping of the shaker bottle by the user's hand.

First compartment 10 also includes a curved closed end 11. Rather than having sharp corners that can trap powdered nutritional supplements and create clumps, thus preventing complete dissolution in the liquid contained in the compartment, curved closed end 10 allows freer movement of any powders and thus better dissolving, less waste and easier clean up.

First compartment 10 is separated from second compartment 14 by divider 12. Second compartment 14 includes both an open end and closed end with a curved closed end 13, which is similar to curved closed end 11. Curved closed end 13 dispenses with powder trapping sharp corners and also provides for freer movement of powders, reduced clumping of nutritional supplements and better dissolution in any liquids, reducing waste and easing clean up.

Second compartment 14 can be used to contain a second set of nutritional supplement powders with associated dissolving liquids (i.e. water and/or various milk products) and/or solid food items such as breakfast cereals, nuts, granola or trail mix. Items contained in second compartment 14 are kept completely separate from material in first compartment 10.

Second compartment top 19 provides an enclosing means for second compartment 14 that functions similarly to first compartment top 22 above. Second opening 20 is closed by second cap 18 that provides a sealed closure to second opening 20. Second compartment top 18 attaches and detaches from the shaker bottle by screwing on and off with threads 15. Second ring 16 allows a clip to be attached and detached from the bottle proximate to the second compartment rather than the first.

In the preferred embodiment, the dual sided shaker bottle is made from plastic free from BPA (bisphenol A). Other materials suitable for the claimed invention include glass, stainless steel, aluminum and any combination thereof (i.e. plastic bottle with stainless steel compartment top 22 or 19)). These materials and manufacturing methods are well known in the art and to those of ordinary skill in the art.

Figure 2:
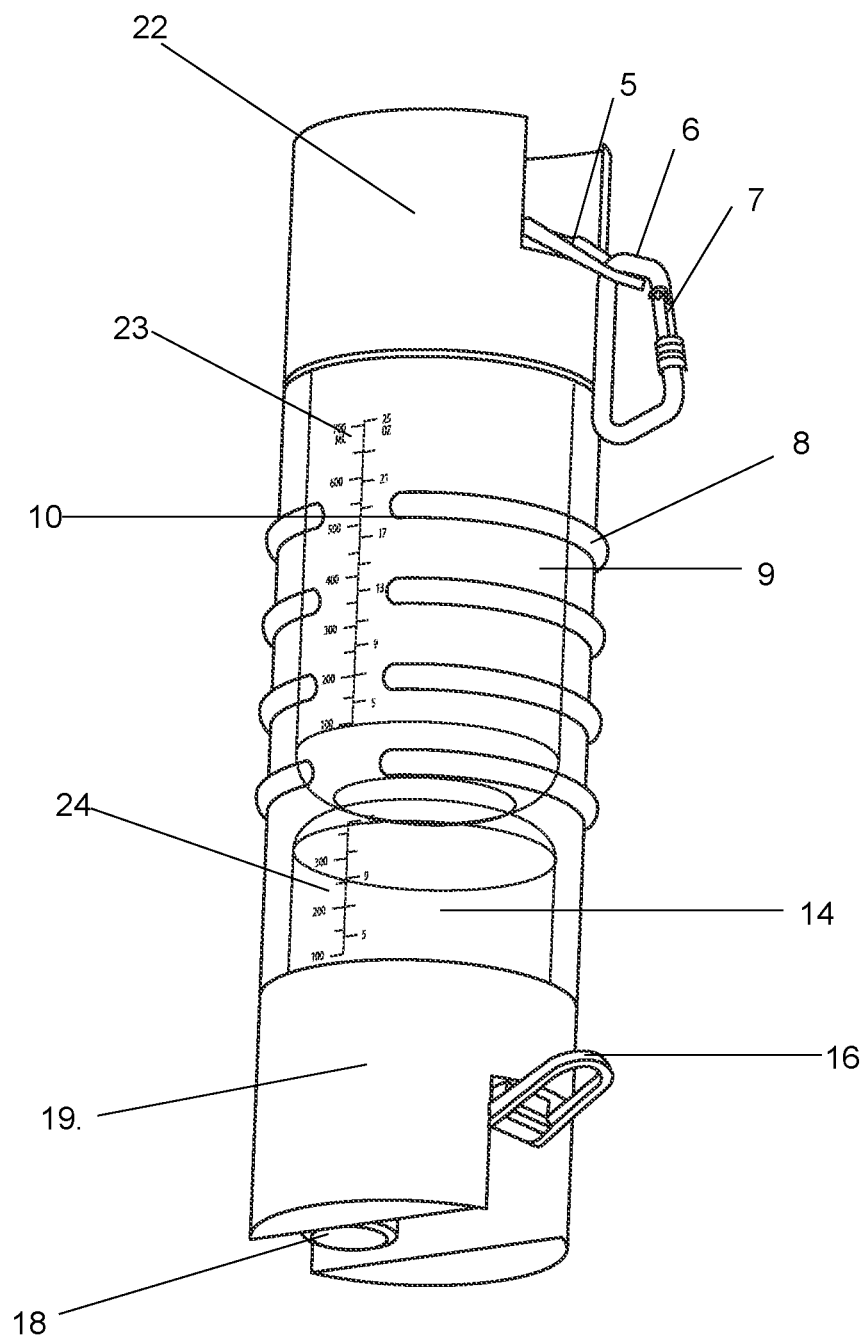
FIG. 2 shows a side angle view of the exterior of the dual compartment shaker bottle.

FIG. 2 shows an outside side view of the claimed invention. First compartment top 22 opens and closes first compartment 10 by being screwed on and off with first threads 21. First clip 6 is attached to first ring 5. First latch 7 opens and closes to allow the device to be clipped to the users gym bag, backpack, clothing or other convenient locations. A plurality of ribs 9 are vertically disposed on the outside of the shaker. The exterior wall of the shaker is comprised of double wall 9. First measuring marking 23 is located vertically along the side of first compartment 10 to allow the user to see the amount of material, liquid or solid, that is contained within the compartment. Second measuring marking 24 is located vertically along the side of second compartment 14 to allow similar measurement of materials contained in that compartment.

Second compartment top 19 closes the opening of second compartment 14 with a similar screw top mechanism as first compartment 10. Also, show in this view, second stopper 18 closes second opening 20. Second clip 16 allows the shaker bottle to be attached to the user's bag or clothing using a similar device as first clip 6.

Both first compartment top 22 and second compartment top 19 have flat ends so that the shaker bottle can stand stably upright when placed on either end.

Figure 3:
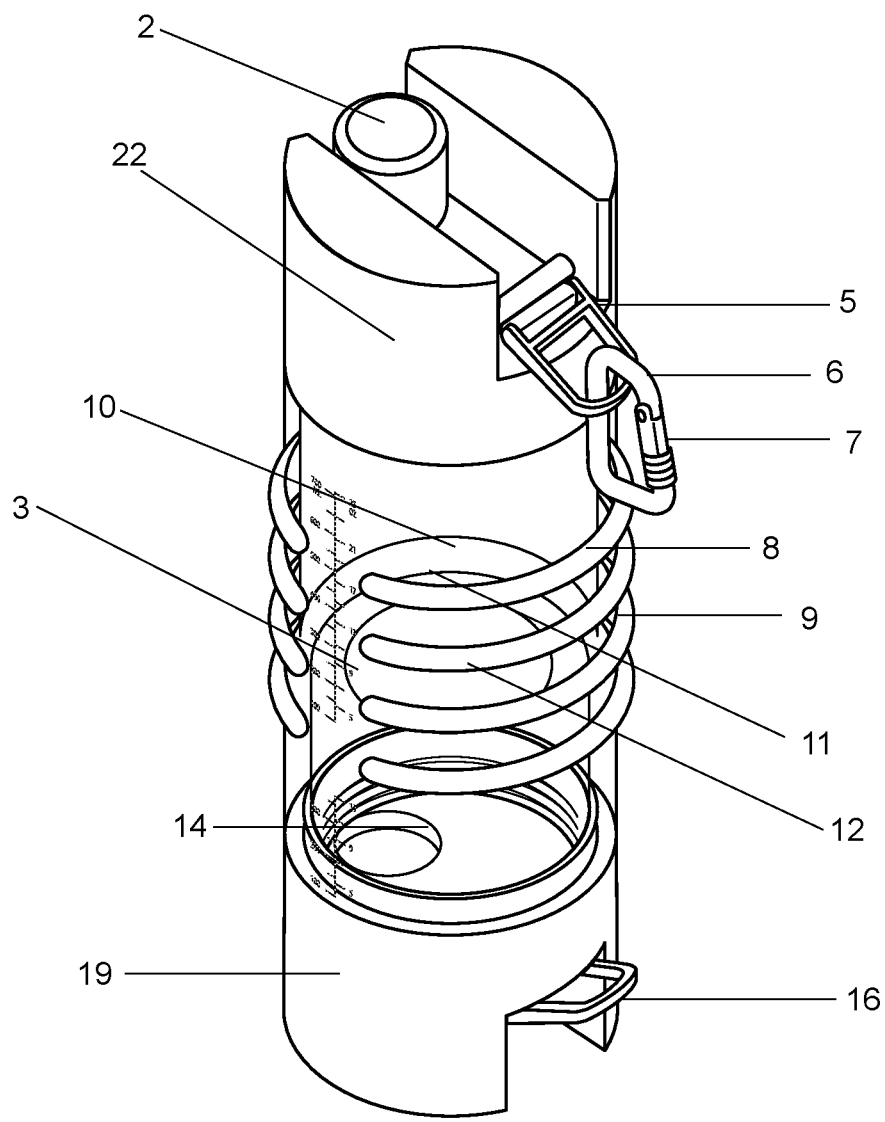
FIG. 3 shows a top angle view of the exterior of the dual compartment shaker bottle.

FIG. 3 shows a top angle view of dual compartment shaker bottle 3. From this angle, the top of first compartment top 22 is clearly visible. First cap 2 is shown disposed at the center top of first compartment top 22. First cap 2 is in place securely closing first opening 1. First ring 5 is shown with first clip 6 attached and first latch 7 closed. A plurality of ribs 8 are disposed along the sides of shaker bottle 3 for easy grip. Double wall 9 is shown enclosing top compartment 10 and bottom compartment 14. Curved closed end 11 is clearly visible in this view with a curved compartment bottom that gently curves to meet double wall 9. Rather that sharp corners that may trap nutritional powders, curve compartment bottom allows for more complete mixing of nutritional supplement powders and liquids. Bottom compartment lid 19 is shown attached to bottom compartment 14. Second clip 16 is visible at the bottom, ready for a clip or other attachment device to be connected to said clip.

Figure 4:
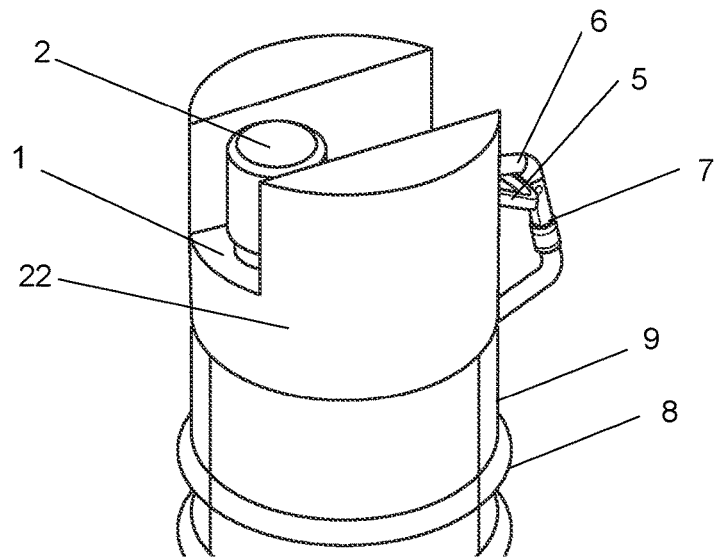
FIG. 4 shows a view of the first compartment top and its component parts.

FIG. 4 is a detailed view of first compartment top 22. First cap 2 is shown installed over first opening 1, providing a secure closure to the opening. First ring 5 is shown with first clip 6 installed and with latch 7 closed. Note that first compartment top 22 is flat to allow the bottle to stand be placed on the top and be stand stably.

Figure 5:
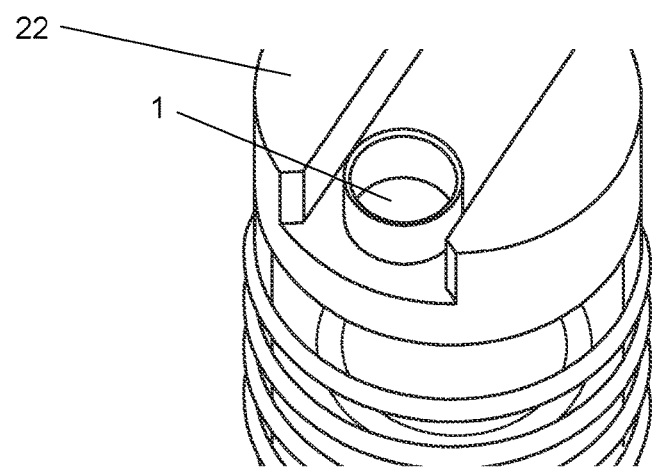
FIG. 5 shows a view of the first compartment top with its first cap removed and the first opening displayed.

FIG. 5 shows first compartment top 22 with first cap 2 removed and first opening clearly visible.

Figure 6:
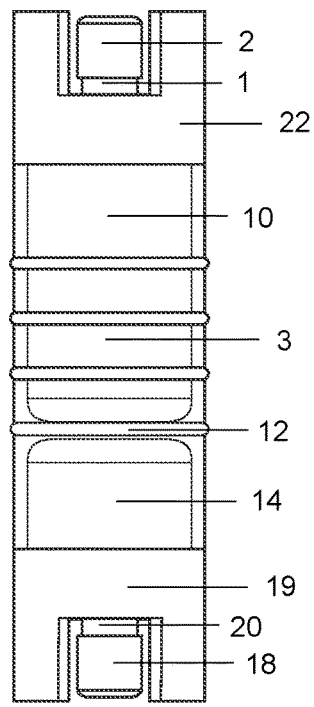
FIG. 6 shows a side vertical view of the exterior dual compartment shaker bottle.

FIG. 6 shows a vertical side view of dual compartment shaker bottle 3. First cap 2 is installed over first opening 1. First compartment top 22 is shown in its attached position closing first compartment 10. First compartment 10 is separated from second compartment 14 by divider 12. Second compartment top 19 is shown in its installed position closing second compartment 14. Second cap 18 is installed closing second opening 20.

Figure 7:
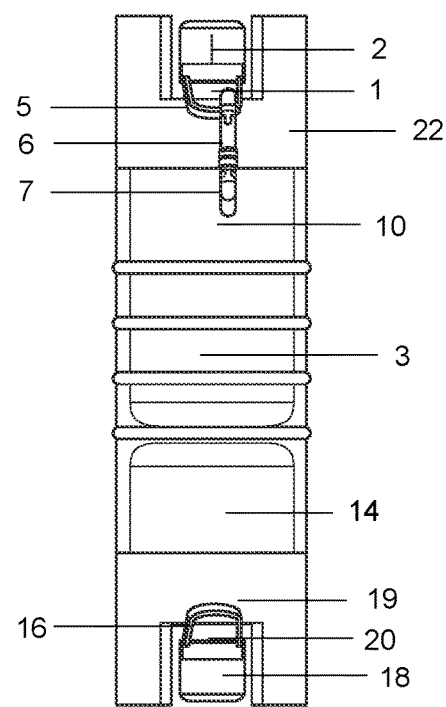
FIG. 7 shows a side vertical view of the exterior dual compartment shaker bottle with the rings and clip visible.

FIG. 7 shows a similar vertical side view of dual compartment shaker bottle 3. In addition to the elements outlined in FIG. 6. FIG. 7 displays first ring 5, first clip 6 and latch 7. First clip 6 is in its installed position attached to first ring 5 with latch 7 closed. Second ring 16 is also shown at its location on second compartment top 19.

Figure 8:
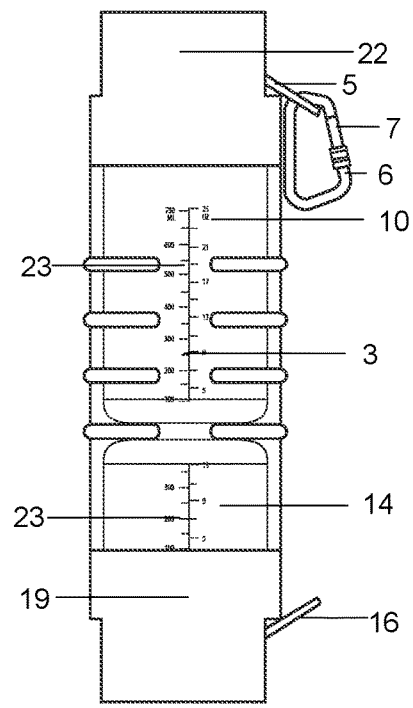
FIG. 8 shows a side vertical view of the exterior dual compartment shaker bottle with the rings and clip visible.

FIG. 8 displays an additional vertical side view of dual compartment shaker bottle 3. In addition to the features outlined in FIGS. 6 and 7, this side view of the bottle shows first measuring marking 23 and second measuring marking 24.

Although the present invention has been described in relation to the above disclosed preferred embodiment, many modifications in design, materials and manufacturing are possible while still maintaining the novel claimed features and advantages of the invention. The preferred embodiment is not meant to limit the claims in any way, and the claims should be given the broadest possible interpretation consistent with the language of the disclosure on the whole.

The invention claimed is:

1. A dual compartment shaker bottle comprising:
A first compartment for storing a first material, said first compartment having a closed end and an open end;
A first compartment top for closing the open end of said first compartment, said first compartment top being selectively attachable and detachable, said first compartment top having an upper surface comprising a recessed channel, the upper surface being substantially planar, said first compartment top having a first opening and a first ring for attaching items to the bottle, both located within the recessed channel of the first compartment top;
The first opening having a selectively attachable and detachable first cap with a substantially planar upper surface, the first cap being located within the recessed channel of the first compartment top and when attached the first cap upper surface forms a substantially planar surface with the first compartment top upper surface;
Said first compartment having a curved closed end surface;
A second compartment for storing a second material, said second compartment having a closed end and an open end;
A second compartment top for closing the open end of said second compartment, said second compartment top being selectively attachable and detachable, said second compartment top having a lower surface comprising a recessed channel, the lower surface being substantially planar, said second compartment top having a second opening and a second ring for attaching items to the bottle, both located within the recessed channel of the second compartment top;
The second opening having a selectively attachable and detachable second cap with a substantially planar lower surface, the second cap being located within the recessed channel of the second compartment top and when attached the second cap lower surface forms a substantially planar surface with the second compartment top lower surface.

2. The dual compartment shaker bottle of claim 1 where the shaker bottle is comprised of an outer wall and an inner wall and an insulating material is disposed between said inner wall and said outer wall.

3. The dual compartment shaker bottle of claim 1 where the exterior of the shaker bottle includes one or more raised ribs.

4. The dual compartment shaker bottle of claim 1 where the first compartment top and second compartment top attach and detach with a screw mechanism.

5. The dual compartment shaker bottle of claim 1 where the shaker bottle is made of plastic.

6. The dual compartment shaker bottle of claim 1 where the shaker bottle is made of stainless steel.

7. The dual compartment shaker bottle of claim 1 where the shaker bottle is made of glass.

8. The dual compartment shaker bottle of claim 1 where the shaker bottle is made of aluminum.

9. The dual compartment shaker bottle of claim 1 where the first opening and the second opening are of different sizes.

10. The dual compartment shaker bottle of claim 1 where one or more of first ring or second ring include a clip with a lockable latch.

11. The dual compartment shaker bottle of claim 1 where one or more of first compartment and second compartment have a measurement marking vertically disposed along the compartment for measuring the volume of material in said compartment.

* * * * *